United States Patent [19]

Fukumoto et al.

[11] Patent Number: 4,519,920

[45] Date of Patent: May 28, 1985

[54] MALEIC ACID/(METH)ACRYLIC ACID COPOLYMERS USEFUL AS CALCIUM ION CAPTURING AGENTS

[75] Inventors: Yasuhisa Fukumoto; Noboru Moriyama, both of Utsunomiya, Japan

[73] Assignee: Kao Soap Co., Ltd., Tokyo, Japan

[21] Appl. No.: 597,814

[22] Filed: Apr. 9, 1984

Related U.S. Application Data

[62] Division of Ser. No. 360,518, Mar. 22, 1982, abandoned.

[30] Foreign Application Priority Data

Apr. 13, 1981 [JP] Japan .................................. 56-55351

[51] Int. Cl.³ ............................................ C08F 220/04
[52] U.S. Cl. .................................... 210/701; 524/425; 524/559; 526/89; 526/240; 526/317
[58] Field of Search ................ 526/240, 317; 524/425, 524/559; 210/701

[56] References Cited

U.S. PATENT DOCUMENTS 4,175,066 11/1979 Shibazaki et al. ................... 524/425

*Primary Examiner*—Harry Wong, Jr.
*Attorney, Agent, or Firm*—Flynn, Thiel, Boutell & Tanis

[57] ABSTRACT

A copolymer of maleic acid (MA) and (meth)acrylic acid (AA), or a salt thereof, wherein the molar ratio (MA/AA) $\gamma$ of the constituent monomers is 1.15 to 2.7, the average molecular weight MW is 1000 to 8000, and $(\gamma) \times (MW)$ is at least 3000. The copolymer is useful as a calcium ion capturing agent, in a process for treating water to inhibit formation of scale surfaces contacted by the water.

6 Claims, 3 Drawing Figures

MALEIC ACID/(METH)ACRYLIC ACID COPOLYMERS USEFUL AS CALCIUM ION CAPTURING AGENTS

This application is a division, of U.S. Ser. No. 360,518 filed Mar. 22, 1982, now abandoned.

The present invention relates to a copolymer of maleic acid (MA) and (meth)acrylic acid (AA), or a salt thereof. More particularly, this invention relates to a copolymer of maleic acid (MA) and (meth)acrylic acid (AA), or a salt thereof, wherein the molar ratio (MA/AA) $\gamma$ of the constituent monomer units in the copolymer is 1.15 to 2.7, the average molecular weight MW is about 1000 to 8000, and the product $(\gamma) \times (MW)$ is at least 3000. In this specification, the term "(meth)acrylic acid" means acrylic acid or methacrylic acid.

Polymaleic acid and copolymers of maleic acid and another polymerizable monomer have heretofore been used as dispersants. The homopolymer of maleic acid is produced in an organic solvent, such as toluene and benzene, in the presence of a peroxide catalyst, such as benzoyl peroxide (BPO). A copolymer of maleic acid and (meth)acrylic acid is used as a dispersant for inorganic pigments (as disclosed in Japanese Patent Publication No. 36 166/79 and U.S. Pat. No. 4 175 066) and as a chelating agent in detergent compositions (as disclosed in Japanese Patent Laid-open Nos. 4510/77 and 140 986/76. These maleic acid/(meth)acrylic acid copolymers are produced in an organic solvent or aqueous solution, but the average molecular weight is about 600 at the most, if the molar ratio (MA/AA) of maleic acid to (meth)acrylic acid in the copolymer is greater than 1. To be more specific, the above-mentioned Japanese Patent Publication No. 36 166/79 discloses that a copolymer having a molar ratio ( MA/AA) of from 2/98 to 20/80 is used as a dispersant for inorganic pigments. In addition, the above-mentioned U.S. Pat. No. 4 175 066 discloses that a copolymer having a molar ratio (MA/AA) of from 5/100 to 200/100 and having a molecular weight of from 1000 to 20000 is used as a dispersant for calcium carbonate. Further, the above-mentioned Japenese Patent Laid-open No. 4510/77 discloses a copolymer having a molecular weight of from 300 to 10000 which is obtained by copolymerizing in the molar ratio (MA/AA) from 1/0.3 to 1/9. The present inventors reviewed these prior art disclosures and found that a high molecular weight maleic acid-(meth)acrylic acid copolymer having an average molecular weight of 1000 or higher cannot be obtained, according to the methods disclosed therein, if the molar ratio MA/AA is greater than 1, and that a copolymer having a molar ratio of MA/AA of greater than 1 and a molecular weight of 1000 or higher cannot actually be produced and such a copolymer is not illustrated in the examples, although a description is made about such a copolymer.

Under these circumstances, the present inventors carried out a series of intensive studies, which led to the discoveries that if 1.2 to 3.0 moles of maleic acid is copolymerized with 1 mole of (meth)acrylic acid, in an aqueous solution maintained at pH 3.5 to 5.0 with an alkali metal hydroxide, it is possible to obtain a high molecular weight copolymer in which the molar ratio (MA/AA) $\gamma$ of maleic acid units to (meth)acrylic acid units in the resulting copolymer is 1.15 to 2.7 and the average molecular weight MW is 1000 to 8000, and further, that those copolymers in which $(\gamma) \times (MW)$ is at least 3000 are much superior in their ability to disperse inorganic pigments and their ability to chelate with calcium ions, in comparison with the known maleic acid (meth)acrylic acid copolymers. The present invention is based on these discoveries.

The copolymer of this invention is characterized in that the content of the maleic acid units in the copolymer is much higher than that of (meth)acrylic acid units and the molecular weight is high. A copolymer of this type can be produced by keeping the pH of the polymerization reaction medium at 3.5 to 5.0, preferably 3.8 to 4.5, with the aid of an alkali metal hydroxide, and by copolymerizing 1.2 to 3.0 moles of maleic acid per 1 mole of (meth)acrylic acid, using a polymerization initiator, in an aqueous solution. More specifically, an aqueous solution of alkali metal monomaleate having a pH 3.5 to 5.0 is prepared by adding 1.00 to 1.15 moles of an alkali metal hydroxide (such as sodium hydroxide or potassium hydroxide) to 1 mole of maleic acid or maleic anhydride. Into this aqueous solution there are added dropwise, separately, a polymerization initiator and (meth)acrylic acid so as to perform copolymerization. During the copolymerization, the aqueous reaction medium should be kept at pH 3.5 to 5.0, preferably 3.8 to 4.5, by adding dropwise an aqueous solution of alkali metal hydroxide from a separate nozzle or by adding dropwise the (meth)acrylic acid which has previously been partly neutralized with an alkali metal neutralizing agent. The higher is the concentration of the aqueous solution of alkali metal monomaleate that is prepared at the beginning, the shorter is the polymerization time and the higher is the concentration of the aqueous solution of the resulting copolymer salt, with the result being that the post-treatment is simplified. The concentration should be as high as possible, and practically, the concentration of solids should be 30 wt. % or higher, preferably from 45 wt. % to 70 wt. % The (meth)acrylic acid or partly neutralized salt thereof can be used as such or in the form of aqueous solution thereof having a concentration of at least 50 wt. %. The (meth)acrylic acid monomer and the polymerization initiator should be added dropwise over as long a time as possible, preferably from 5 hours to 10 hours. The temperature for the copolymerization reaction should be from 80° C. to 120° C., preferably from 90° C. to 110° C., in order to shorten the polymerization time and improve the yield. As the polymerization initiator, persulfates, water-soluble azobis compounds, and aqueous hydrogen peroxide solution can be used. Hydrogen peroxide solution is preferable because the resulting polymer is less discolored and the yield is high. Hydrogen peroxide solution can be used in combination with other initiators, such as persulfates. It can be used in combination with a reducing agent, such as tartaric acid and ascorbic acid. The initiator can preferably be used in an amount from 0.05 mole to 0.5 mole per 1 mole of the total monomers.

According to the conventional method, the extent of polymerization does not increase and a considerable quantity of monomers remains unreacted, whereas according to the process of this invention, the extent of polymerization exceeds 90% and a copolymer can be obtained which has a constitution very close to the ratio of the monomers fed in. Usually, the higher is the ratio of maleic acid/(meth)acrylic acid, the larger is the quantity of maleic acid that remains unreacted. According to the process of this invention, a copolymer having almost the same constitution as the feed composition is obtained if the molar ratio of maleic acid (MA)/(meth)acrylic acid (AA) in the feed composition is 1.80 or lower. For instance, if this ratio is 1.50, the molar ratio ($\gamma$) of maleic acid/(meth)acrylic acid in the resulting copolymer is 1.40 to 1.45. If the molar ratio of the maleic acid/(meth)acrylic acid feed composition is in excess of 1.80, the molar ratio ($\gamma$) in the resulting copolymer is a little smaller than the molar ratio in the feed composition. Yet, if the feed molar ratio is MA/AA=2.00, the molar ratio ($\gamma$) in the resulting copolymer is 1.70 to 1.90, and if the feed molar ratio is MA/AA=2.50, the molar ratio ($\gamma$) in the resulting copolymer is 2.15 to 2.30. As compared with the conventional method, the copolymer, obtained by the method according to the invention, has a constitution closer to the composition of the feed monomers. If the feed MA/AA molar ratio is lower than 1.2, the resulting copolymer is not sufficiently effective in its pigment dispersing ability and calcium ion chelating ability. If the feed MA/AA molar ratio is in excess of 3.0, the extent of polymerization does not increase and more maleic acid remains unreacted. Thus, it is substantially impossible to obtain a high-molecular weight copolymer. Preferable copolymers can be obtained when the feed MA/AA molar ratio is 1.3 to 2.6.

The average molecular weight of maleic acid/(meth)acrylic acid copolymer thus obtained is usually from 1000 to 8000. There is a tendency that the higher is the feed molar ratio of maleic acid/(meth)acrylic acid, the smaller is the average molecular weight of the resulting copolymer. A copolymer having an average molecular weight from 1500 to 6000 is preferable, and a copolymer having an average molecular weight from 2000 to 5000 is especially preferable. Even when the molar ratio ($\gamma$) of maleic acid/(meth)acrylic acid of the resulting maleic acid/(meth)acrylic acid copolymer is greater than 1, the desired ability to disperse pigments and to chelate calcium ions is not sufficient, unless the average molecular weight (MW) is greater than a certain value. It was found that $(\gamma) \times (MW)$ should be at least 3000. On the other hand, according to the method of this invention, it is difficult to produce a copolymer in which $(\gamma) \times (MW)$ is greater than 8000. A copolymer in which $(\gamma) \times (MW)$ is from 4000 to 6000 is most preferable.

It is not completely understood why a copolymer containing such a large content of maleic acid and having a high average molecular weight is obtained, according to the method of this invention. Presumably, so long as the pH of the aqueous solution is within the range as specified by the method of this invention, the maleic acid is in the form of a monoacid which forms intramolecular hydrogen bonds, causing the molecule to assume a planar structure and increasing the radical resonance stabilization, with the result being that it possesses increased polymerizability. As a result, even when the molar ratio of the feed maleic acid/(meth)acrylic acid is high, the extent of polymerization does not decrease so much and a copolymer of high molecular weight can be obtained. If the pH of the system is outside the specified range during the polymerization, a satisfactory extent of polymerization is not obtained and the resulting copolymer has a low average molecular weight.

The resulting copolymer can be converted into alkali metal salts by using alkali metal hydroxides (e.g., NaOH, KOH, and LiOH) and alkali metal carbonates (e.g., $Na_2CO_3$ and $K_2CO_3$). The alkali metal can be replaced partly by an alkaline earth metal, or a portion of the copolymer can be left unneutralized.

The maleic acid/(meth)acrylic acid copolymer of this invention was found to be superior in dispersing ability and calcium ion chelating ability, and to be suitable as a pigment dispersant and as a calcium ion capturing agent.

As a pigment dispersant, it can be used with inorganic pigments, such as calcium carbonate, titanium oxide, satin white, barium sulfate, clay, and kaolin. It can be used most suitably to disperse calcium carbonate. Calcium carbonate comes in various grades with respect to particle size and configuration, depending on the manufacturing conditions. The copolymer of this invention can be applied to any grade of calcium carbonate, but it is particularly effective for precipitated calcium carbonate. The copolymer of this invention exhibits a remarkable effect as demonstrated in Example 4 when used as a pigment dispersant. In Example 4, it was demonstrated that when the copolymer of this invention was added in an amount of only 1.5 wt. %, based on the pigment solids, to an aqueous slurry containing as much as 70 wt. % solids of calcium carbonate, the viscosity of the slurry was decreased to 700 cps or less (at 25° C.), which is low enough to make the slurry transportable (pumpable). Such a remarkable effect cannot be acheived by the conventional pigment dispersants, such as sodium polyacrylate, maleic acid-$\alpha$-olefin copolymer, maleic acid-acrylic acid copolymer in which the content of maleic acid units is lower than that of acrylic acid units, and sodium polymaleate. It is not completely understood why such an outstanding dispersing effect can be obtained. Presumably, the copolymer contains maleic acid in a large quantity and is high in molecular weight, and, therefore, the copolymer has a high adsorbability for calcium carbonate. The dispersant of this invention should preferably be used in an amount from 0.1 to 5 wt. %, based on the pigment, depending on the kind of pigments used.

When used as a calcium ion capturing agent, the maleic acid/(meth)acrylic acid copolymer should be in the form of an alkali metal salt. Applications as a calcium ion capturing agent include scale prevention (as a boiler feed water treating compound) and as an ingredient of detergent compositions (as a detergent builder). As for its calcium ion chelating ability, the copolymer of this invention is far superior to polyacrylate, polymaleate, and maleic acid/acrylic acid copolymer salt in which the content of maleic acid units is lower than that of acrylic acid units.

Figure 1:
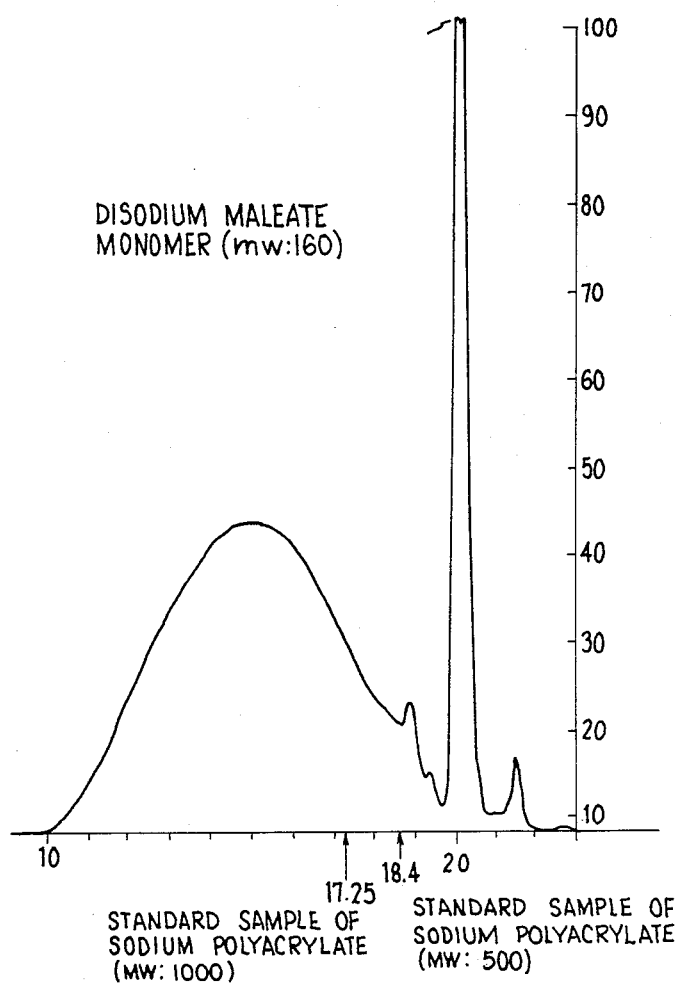
FIG. 1 is a gel permeation chromatogram of Experiment No. 1.

The invention is illustrated in detail by the following illustrative examples, which are not intended to limit the scope of the invention.

EXAMPLE 1

Into a flask equipped with a dropping funnel, reflux condenser, nitrogen inlet, and stirrer, there were charged 332.2 g (3.40 moles) of maleic anhydride (molecular weight 98) and deionized water. Then 48% sodium hydroxide was added with stirring in such an amount that the molar ratio of maleic anhydride/- sodium hydroxide was 1.00/1.05. Thus, there was prepared an aqueous solution containing 50 wt. % of monosodium maleate. The pH of this aqueous solution was 4.1. While introducing nitrogen into the flask, the temperature was increased to 100° C. Then, 153 g of an aqueous solution of 80% acrylic acid (net content of acrylic acid was 122.4 g, that is, 1.70 moles, and the molar ratio of maleic acid/acrylic acid charged was 2.00) and 124 g of 35% hydrogen peroxide solution were added dropwise through separate dropping funnels over 6 hours. Simultaneously with dropwise addition of the aqueous solution of acrylic acid, 35.4 g of 48% sodium hydroxide was added dropwise over 6 hours. During the polymerization reaction, the pH measured every hour was in the range from 4.0 to 4.3. After addition of the reactants was completed, 2.5 g of ascorbic acid was added, and the solution was aged for 1 hour at 100° C. and then was left standing for cooling to room temperature. The pH of the solution was 4.2. Deionized water and 48% sodium hydroxide were added, and there was obtained a complete sodium salt of maleic acid/acrylic acid copolymer containing 40 wt. % solids and having pH 8. The determination of residual maleic acid by the bromine-bromide method indicated that the resulting copolymer had a maleic acid/acrylic acid molar ratio of 1.85.

As comparative examples, maleic acid/acrylic acid copolymers were prepared as described above, except that the molar ratio of charged maleic acid/acrylic acid was fixed at 2.00, the quantity of sodium hydroxide for neutralization of the initial 50 wt. % aqueous maleate solution was varied, and the sodium hydroxide, for pH adjustment, was not added during polymerization. Table 1 shows the average molecular weight (MW) and the maleic acid/acrylic acid molar ratio ($\gamma$) of the resulting copolymers.

adding nitrogen gas into the flask, 162 g of an aqueous solution of 80% acrylic acid (net content of acrylic acid was 129.6 g, that is, 1.80 moles, and the molar ratio of maleic acid/acrylic acid charged was 1.50), an aqueous solution of initiator mixture consisting of 96.2 g of 35% hydrogen peroxide solution and 49 g of 30% aqueous solution of ammonium persulfate, and 45 g of 48% aqueous solution of sodium hydroxide were added dropwise through separate dropping funnels over 5 hours. After aging for 1 hour at 100° C., the reactants were allowed to stand at room temperature. The pH of the solution was 4.3. Deionized water and 48% sodium hydroxide were added, and there was obtained an aqueous solution of sodium salt of maleic acid/acrylic acid copolymer containing 40 wt. % solids and having pH 8. The determination of residual monomers indicated that the extent of polymerization was as high as 96.7%. The maleic acid/acrylic acid molar ratio ($\gamma$) of the resulting copolymer, calculated on the assumption that the unreacted monomer is maleic acid alone, was 1.42 and the average molecular weight (MW) was 3400.

For comparison, maleic acid/acrylic acid copolymers were produced as described above, except that the molar ratio of charged maleic acid/acrylic acid was fixed at 1.50, the quantity of sodium hydroxide for neutralization of the initial 50 wt. % aqueous maleate solution was varied, and the sodium hydroxide for pH adjustment was not added during polymerization. Table 2 shows the average molecular weight (MW) and the maleic acid/acrylic acid molar ratio ($\gamma$) of the resulting copolymers.

TABLE 1

| Experiment No. | Degree of neutralization of maleic acid (maleic acid/ NaOH molar ratio) | Final pH | Extent of polymerization (mol %)*1 | MW*2 | $\gamma$*3 | MW × $\gamma$ |
|---|---|---|---|---|---|---|
| 1 | 1.00/1.05 | 4.2 | 94.9 | 2500 | 1.85 | 4625 |
| 2 | 1.00/0.75 | 2.9 | 66.6 | 700 | 1.01 | 707 |
| 3 | 1.00/1.50 | 5.4 | 83.0 | 1500 | 1.49 | 2235 |
| 4 | 1.00/2.00 | 6.3 | 77.5 | 900 | 1.33 | 1197 |

Figure 2:
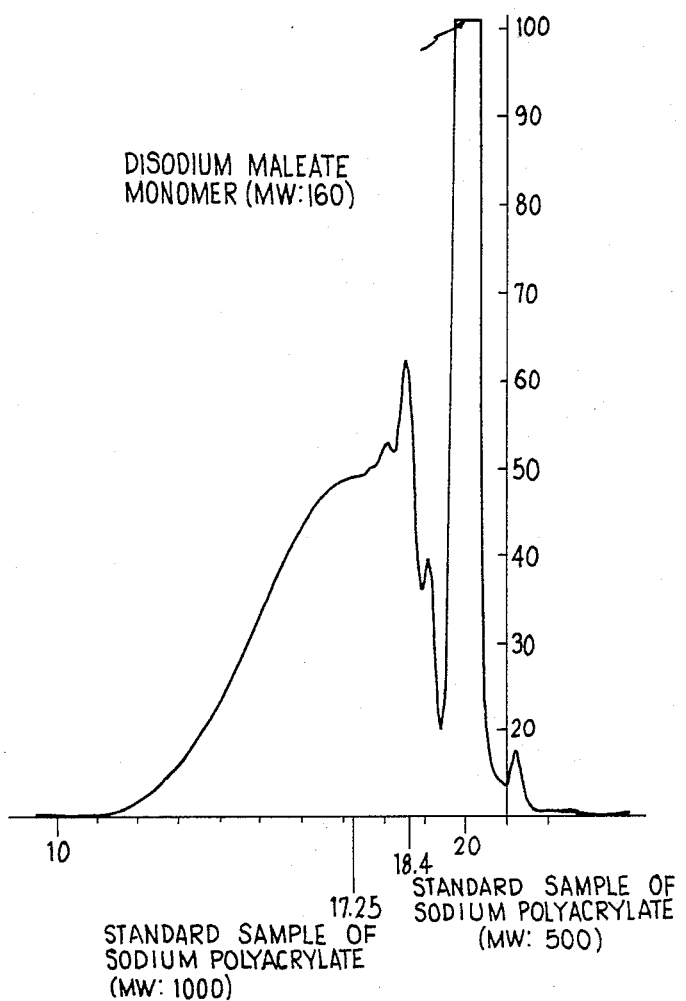
FIG. 2 is a gel permeation chromatogram of Experiment No. 4.

Experiment No. 1 is an Example of this invention.
Experiment Nos. 2 to 4 are Comparative Examples.
*1 Extent of polymerization: At first, the total residual monomers (maleic acid and acrylic acid) were determined by the bromine-bromide method. Then, the residual acrylic acid was determined by the bromide-bromate method. It was found that the residual acrylic acid was very small as compared with the residual maleic acid. The residual maleic acid was determined by subtracting the residual acrylic acid from the total residual monomers.
*2 Average molecular weight: The sodium salt of the copolymer was diluted with deionized water to a concentration of 500 mg (as solids) per 100 ml of solution. A portion (100 μl) of this solution was subjected to gel permeation chromatography in 0.15 M phosphate buffer solution (pH 7.0) at room temperature, using an aqueous column G4000PW/G2000SW (a product of Toya Soda Co., Ltd.). The number-average molecular weight was determined from the result of this chromatography. Absorbance at 215 nm was determined using the spectrophotometric detector SPD-1 made by Shimazu Seisakusho Ltd. The same technique was used in the following Examples. The gel permeation chromatograms of Experiment No. 1 (example of this invention) and Experiment No. 4 (comparative example) are shown in FIGS. 1 and 2, respectively.
*3 $\gamma$: Since the residual monomers were almost exclusively maleic acid, this value was obtained by assuming that the unreacted monomers were maleic acid alone.

EXAMPLE 2

Into a flask equipped with a dropping funnel, reflux condenser, nitrogen inlet, and stirrer, there were charged 264.6 g (2.70 moles) of maleic anyhydride and deionized water. Then 48% sodium hydroxide was added with stirring at a ratio of 1.05 moles per 1.00 mole of maleic anhydride to prepare an aqueous solution containing 50 wt. % of monosodium maleate (pH 4.1). After the temperature was increased to 100° C. while

TABLE 2

| Experiment No. | Degree of neutralization of maleic acid (maleic acid/ NaOH molar ratio) | Final pH | Extent of polymerization (mol %) | MW | $\gamma$ | MW × $\gamma$ |
|---|---|---|---|---|---|---|
| 5 | 1.00/1.05 | 4.3 | 96.7 | 3400 | 1.42 | 4828 |
| 6 | 1.00/0.75 | 3.0 | 76.0 | 1000 | 0.90 | 900 |
| 7 | 1.00/1.50 | 5.8 | 87.0 | 2000 | 1.18 | 2360 |
| 8 | 1.00/2.00 | 6.5 | 84.5 | 1500 | 1.11 | 1665 |

Experiment No. 5 is an example of this invention, and Experiment Nos. 6 to 8 are comparative examples.

EXAMPLE 3

In separate experiments, into a flask equipped with a dropping funnel, reflux condenser, nitrogen inlet, and stirrer, there were charged 294 g (3.00 moles) of maleic anhydride and deionized water. Then 48% aqueous sodium hydroxide solution was added with stirring in such an amount that the molar ratio of maleic anhydride/sodium hydroxide was 1.00/1.05. Thus, there was prepared an aqueous solution containing 50 wt. % of monosodium maleate (pH 4.3). After the temperature was increased to 100° C. with introduction of nitrogen into the flask, the quantity of 80% aqueous acrylic acid solution added in the respective experiments was set at 225 g (net acrylic acid content was 180 g, that is, 2.50 moles), 150.3 g (net acrylic acid content was 120.2 g, that is, 1.67 moles), and 112.5 g (net acrylic acid content was 90.0 g, that is, 1.25 moles), respectively, so that the molar ratios of charged maleic acid/acrylic acid in the respective experiments were 1.20, 1.80, and 2.40. These aqueous acrylic acid solutions, 107 g of 35% hydrogen peroxide solution, and 62.5 g, 41.8 g, and 31.2 g, respectively, of 48% aqueous solution of sodium hydroxide were added dropwise through separate dropping funnels over 6 hours. During polymerization the pH was measured every hour, and it was confirmed that the pH was in the range of from 3.8 to 4.5. Subsequently, in the same manner as described in Example 1, there was obtained an aqueous solution of sodium salt of maleic acid/acrylic acid copolymer containing 40 wt. % solids and having pH 8. Table 3 shows the extent of polymerization, the maleic acid/acrylic acid molar ratio ($\gamma$), and the average molecular weight (MW) of the resulting copolymers.

TABLE 3

| Experiment No. | Molar ratio of maleic acid/ acrylic acid charged | Extent of polymerization (mol %) | MW | $\gamma$ | MW × $\gamma$ |
| --- | --- | --- | --- | --- | --- |
| 9 | 1.20 | 97.8 | 4000 | 1.16 | 4640 |
| 10 | 1.80 | 95.2 | 3000 | 1.66 | 4980 |
| 11 | 2.40 | 92.2 | 2100 | 2.14 | 4494 |

Experiment Nos. 9 to 11 are Examples of this invention.

EXAMPLE 4

(Evaluation of ability to disperse pigments)

Into respective 500 ml stainless steel beakers were placed different kinds of polymeric dispersants (listed in Table 4) in amounts such that the solid polymeric dispersant, calculated as the solids, was 1.5 wt. %, based on pigment (described below). Deionized water was added to make uniform solutions. Cubic calcium carbonate (precipitated calcium carbonate) having an average particle size of 0.15μ was added in an amount of 70 wt. %. The contents were stirred with a disperser (blade radius 1.9 cm) at 5000 rpm for 10 minutes to make slurries. The viscosities of the resulting slurries were measured using a Brookfield type viscometer at 60 rpm and 25° C. The results are shown in Table 4.

TABLE 4

| | Polymers (dispersants) tested | | | Viscosity of 70 wt % aq. calcium carbonate slurry |
| --- | --- | --- | --- | --- |
| | $\gamma$ | MW | $\gamma$ × MW | (cp, 60 rpm/25° C.) |
| This invention | 1.85 | 2500 | 4625 | 570 |
| Maleic acid/ | 1.42 | 3400 | 4828 | 510 |
| acrylic acid copolymer Na salt | | | | |
| Comp. Example | 0.90 | 1000 | 900 | 3000 |
| Maleic acid/ | 1.18 | 2000 | 2360 | 1450 |
| acrylic acid | 1.11 | 1500 | 1665 | 2500 |
| copolymer Na salt | 0.5 | 4500 | 2250 | 1900 |
| Maleic acid/diisobutylene copolymer Na salt | | | | 10,000 or more |
| Sodium polyacrylate (MW 4000) | | | | 10,000 or more |
| Sodium polymaleate* (MW 700) | | | | 3500 |

Note
*The sodium polymaleate was produced by polymerization with benzoyl peroxide initiator in toluene solvent, followed by neutralization.

EXAMPLE 5

(Evaluation of calcium ion chelating capacity)

Four kinds of chelating agents A to D as shown in Table 5 were used for the evaluation. A calcium ion electrode was immersed in the solution of the following composition while the solution was stirred with a magnetic stirrer. Five minutes later, the potential was measured and the concentration of calcium ions in the solution was determined to evaluate the calcium ion chelating capacity.

| Composition of solution | |
| --- | --- |
| $CaCl_2$ (3.3 × $10^{-3}$ mol/l) | 50 ml |
| Chelating agent | X mg/50 ml |
| 4 M KCl solution | 2 ml |

Figure 3:
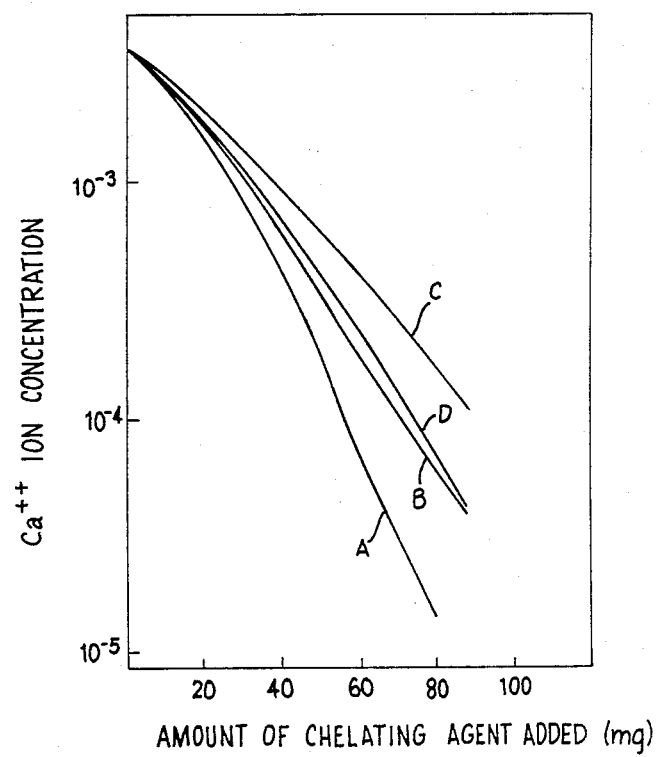
FIG. 3 is a graph showing the results of evaluation of the calcium ion chelating capacity carried out in Example 5.

The results are shown in FIG. 3. Table 5 compares the chelating capacity of the four chelating agents, which chelating capacity is expressed in terms of mg of $CaCO_3$ per 1 g of chelating agent, based on addition of 40 mg of chelating agent.

TABLE 5

| | Chelating agents | | Chelating capacity ($CaCO_3$ mg/chelating agent 1 g) |
| --- | --- | --- | --- |
| This invention | A: | Na salt of maleic acid/ acrylic acid copolymer ($\gamma$ = 1.85, MW = 2500, $\gamma$ × MW = 4625) | 345 |
| Comp. Example | B: | Na salt of maleic acid/ acrylic acid copolymer ($\gamma$ = 0.50, MW = 4500, $\gamma$ × MW = 2250) | 300 |
| Comp. Example | C: | Na salt of polyacrylate (MW 4000) | 250 |
| Comp. Example | D: | Na salt of polymaleate (MW 700) | 295 |

We claim:
1. A process for treating water to inhibit formation of scale on surfaces contacted by the water, which comprises: mixing in the water an effective amount of a calcium ion capturing agent for chelating the calcium ions contained in the water to prevent deposition of scale on surfaces contacted by the water, said calcium ion capturing agent being an alkali metal salt of a copolymer of maleic acid (MA) and a monomer (AA) selected from the group consisting of acrylic acid and methacrylic acid, wherein the mol ratio ($\gamma$) of the monomer units MA/AA is from 1.15 to 2.7, the number average molecular weight (MW) of the copolymer is from 1000 to 8000, and the product of ($\gamma$) multiplied by (MW) is at least 3000.

2. A process as claimed in claim 1 wherein (MW) is from 1500 to 6000.

3. A process as claimed in claim 1 wherein (MW) is from 2000 to 5000.

4. A process as claimed in claim 1 wherein the mol ratio ($\gamma$) of the monomer units is from 1.3 to 2.6.

5. A process as claimed in claim 1 wherein the product of ($\gamma$) multiplied by (MW) is from 4000 to 6000.

6. A process as claimed in claim 1 in which the water is boiler feed water or circulating water containing calcium ions.

* * * * *